United States Patent [19]
Baldoni et al.

[11] Patent Number: 5,755,922
[45] Date of Patent: May 26, 1998

[54] TIRE BUILDING DRUM HAVING ADJUSTABLE AXIAL LENGTH

[75] Inventors: Viscardo Baldoni; Giancarlo Scarpetti, both of Rome; Raffaele Muzi, Pomezia, all of Italy

[73] Assignee: Bridgestone Corporation, Tokyo, Japan

[21] Appl. No.: 769,236

[22] Filed: Dec. 18, 1996

[30] Foreign Application Priority Data

Dec. 22, 1995 [IT] Italy .................. TO95A1046

[51] Int. Cl.⁶ .................................. B29D 30/24
[52] U.S. Cl. ........................... 156/415; 156/414
[58] Field of Search ................... 156/415, 416, 156/414, 417–420

[56] References Cited

U.S. PATENT DOCUMENTS

| | | | |
|---|---|---|---|
| 3,188,260 | 6/1965 | Nebout | 156/416 |
| 3,510,375 | 5/1970 | Batten | 156/415 |
| 4,138,307 | 2/1979 | Rost | 156/419 |
| 4,206,010 | 6/1980 | Gutnecht | 156/415 |
| 4,402,783 | 9/1983 | Enders | 156/415 |
| 5,310,328 | 5/1994 | Imai et al. | 156/415 |
| 5,490,897 | 2/1996 | Miyanaga et al. | 156/415 |

*Primary Examiner*—Geoffrey L. Knable
*Attorney, Agent, or Firm*—Carmen S. Santa Maria

[57] ABSTRACT

A tire building drum (1) wherein two coaxial cylindrical half-drums (5) are fitted in sliding manner to a tubular central shaft (2), are moved in opposite directions along the central shaft (2) by a central screw (3), and are connected to each other by a telescopic central body (6) defined by a central tubular element (8) fixed in relation to an intermediate point of the central shaft (2), by two tubular end elements (10) integral with respective half-drums (5), and by at least an intermediate segment (13) interposed between the central tubular element (8) and each tubular end element (10), supported in sliding manner by the central tubular element (8), and movable towards the central tubular element (8) in opposition to a number of springs (23) and by virtue of the relative tubular end element (10).

18 Claims, 3 Drawing Sheets

TIRE BUILDING DRUM HAVING ADJUSTABLE AXIAL LENGTH

BACKGROUND OF THE INVENTION

The present invention relates to a tire building drum.

U.S. Pat. No. 4,402,783 relates to a tire building drum comprising a central shaft; two coaxial cylindrical half-drums fitted in sliding manner to the central shaft; actuating means for moving the two half-drums in opposite directions along the central shaft; and a telescopic, substantially cylindrical central body coaxial with and connecting the two half-drums; the central body in turn comprising a central tubular element integral with an intermediate point of the central shaft, two tubular end elements integral with respective half-drums, and at least an intermediate segment interposed between the central tubular element and each tubular end element.

The intermediate segments of the above known building drum only assume a precise position in relation to the half-drums and the central tubular element when the telescopic central body is either fully extended or fully contracted, and are in no way position controlled with the telescopic body in an intermediate position, i.e. when forming the carcass, or as the half-drums move back to the cycle-start position. In other words, the above known drum fails to provide for a definite relationship between the length of the telescopic central body and the position of the intermediate segments.

Such a situation may result in serious trouble, especially when forming the carcass. At this stage, in fact, the half-drums are moved rapidly towards each other so that the intermediate segments fit one inside the other, and more or less serious jamming frequently occurs in the event all the intermediate segments are moved together.

SUMMARY OF THE INVENTION

It is an object of the present invention to provide a tire building drum designed to overcome the aforementioned drawback.

More specifically, it is an object of the present invention to provide a tire building drum wherein a given length of the telescopic central body corresponds to a definite given position of the intermediate segments in relation to the central tubular element.

According to the present invention, there is provided a tire building drum comprising a central shaft; two coaxial cylindrical half-drums fitted in sliding manner to the central shaft; actuating means for moving the two half-drums in opposite directions along the central shaft; and a telescopic, substantially cylindrical central body coaxial with and connecting the two half-drums; the central body in turn comprising a central tubular element integral with an intermediate point of the central shaft, two tubular end elements integral with respective half-drums, and at least an intermediate segment interposed between the central tubular element and each tubular end element; said central tubular element and each tubular end element being adjacent elements to a relevant intermediate-segment; characterized in that said intermediate segment is supported in sliding manner by the central tubular element; and in that elastic means are interposed between each intermediate segment and a first one of the relevant adjacent elements; each intermediate segment being movable towards the relevant first adjacent element in opposition to said elastic means, and being movable towards the central tubular element by virtue of the relative tubular end element.

According to a preferred embodiment of the building drum set forth above, each intermediate segment is a tubular segment having an inside diameter greater than an outside diameter of the relative tubular end element, and an outside diameter smaller than an inside diameter of the central tubular element; said tubular elements and segments being of such lengths as to permit the telescopic central body to vary its own length between a maximum value, approximately equal to but no greater than the sum of the lengths of said tubular elements and segments, and a minimum value substantially equal to the length of the central tubular element.

BRIEF DESCRIPTION OF THE DRAWINGS

The invention will now be described by way of examples and with reference to the accompanying drawings, in which.

DETAILED DESCRIPTION OF THE INVENTION

Figure 1:
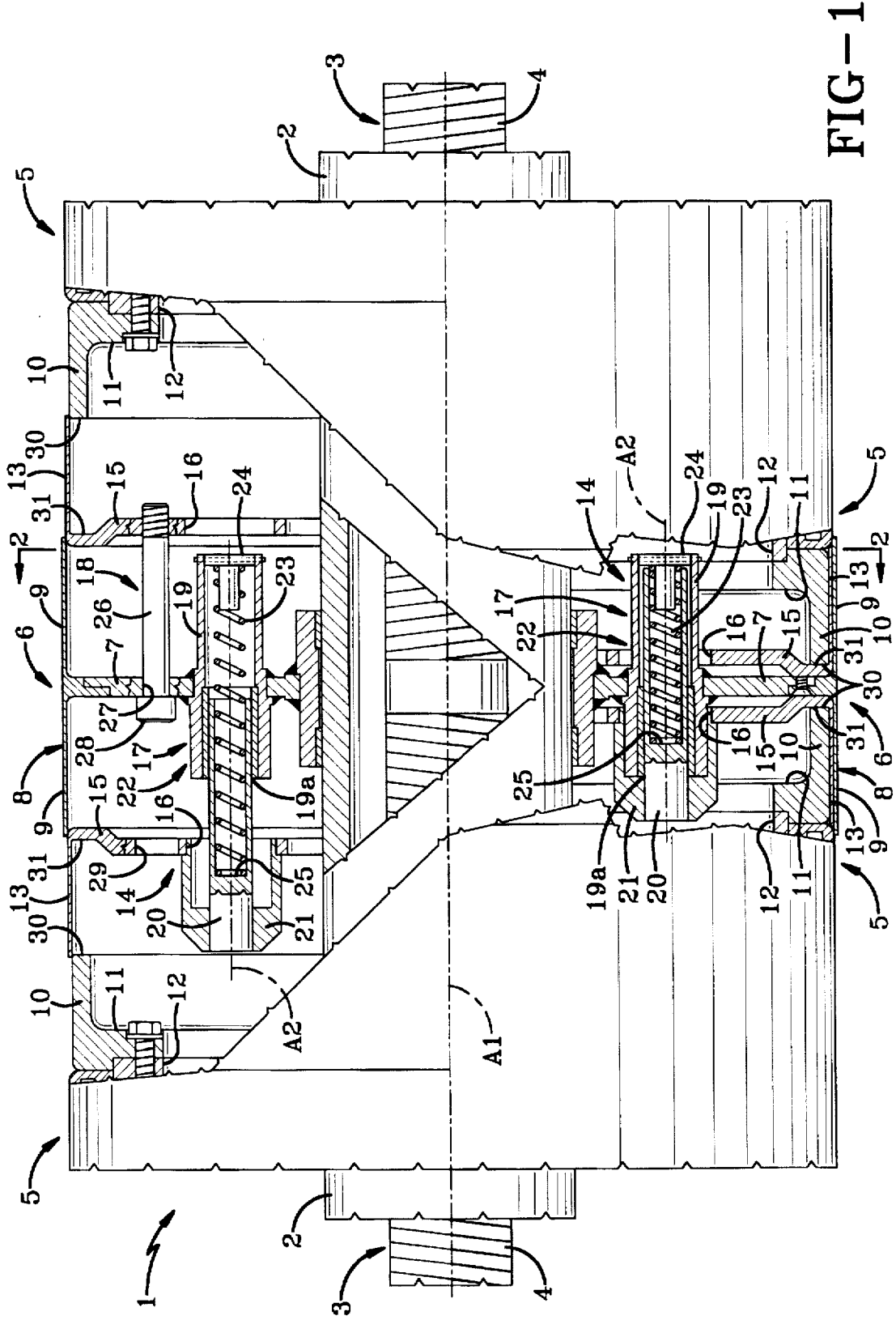
FIG. 1 shows a schematic axial half-section, with parts removed for clarity, of a central portion of a first preferred embodiment of the drum according to the present invention in two distinct operating positions.
Figure 2:
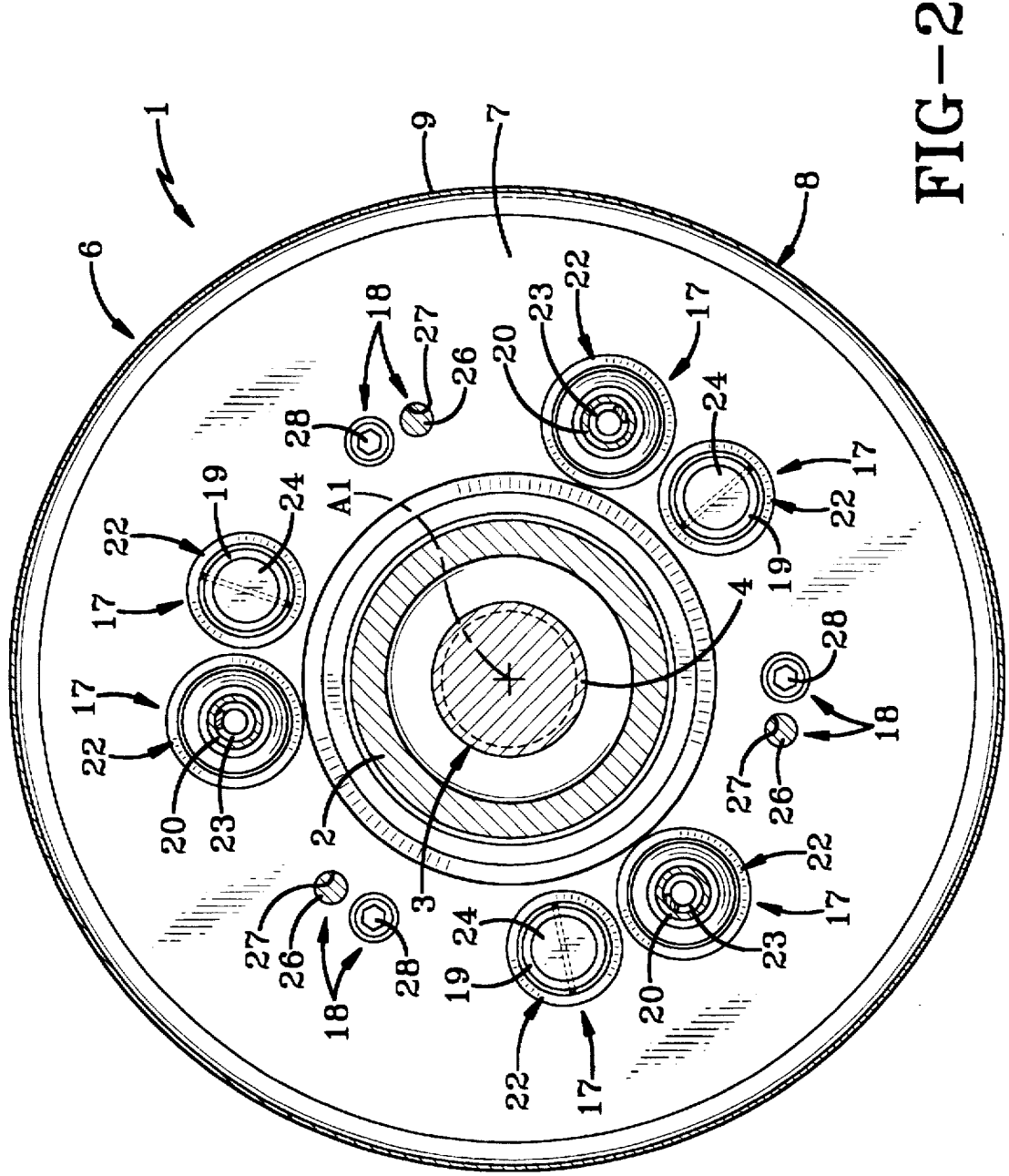
FIG. 2 is a section along line II—II of FIG. 1.

Numeral 1 in FIGS. 1 and 2 indicates a tire building drum, which rotates about an axis A1, and comprises a tubular central shaft 2 coaxial with axis A1, and an actuating screw 3 mounted for rotation inside shaft 2 and coaxially with axis A1, and presenting two opposite threads 4 at opposite ends.

Drum 1 also comprises two cylindrical half-drums 5 fitted in sliding manner to shaft 2, coaxially with each other and with axis A1, and each presenting a respective radial anti-rotation element (not shown), which engages in sliding manner a longitudinal slot (not shown) formed through shaft 2, and is fitted on the end with a nut screw (not shown) engaging a respective thread 4 so that, for each turn of screw 3 about axis A1, half-drums 5 move in opposite directions along shaft 2.

Drum 1 also comprises a telescopic, substantially cylindrical central body 6 coaxial with and connecting half-drums 5. More specifically, body 6 comprises an annular flange 7 fitted to shaft 2 at an intermediate point of shaft 2; and a central tubular element 8 fitted about flange 7, and presenting two tubular portions 9 extending symmetrically from and on either side of flange 7.

Body 6 also comprises two tubular end elements 10 integral with respective half-drums 5 and extending towards each other and towards element 8 from respective end surfaces 11, which are crosswise to axis A1, face each other and flange 7, and each present a respective annular cavity 12.

Body 6 also comprises two intermediate tubular segments 13, which are movable in relation to both central tubular element 8 and respective tubular end elements 10, and are supported, in an intermediate position between element 8 and respective elements 10, by a supporting assembly 14 forming part of drum 1. Assembly 14 comprises two annular flanges 15 connected to the ends of respective segments 13 facing element 8; each flange 15 presents three pairs of holes 16 equally spaced about axis A1; and the holes 16 in each pair formed in one of flanges 15 are coaxial with the holes 16 in a respective pair formed in the other flange 15, and with a respective axis A2 parallel to axis A1.

Assembly 14 also comprises an elastic thrust device 17 for positioning segments 13 in a respective idle position in which each flange 15 of each segment 13 is separated from flange 7 by a given distance substantially equal to half the length of element 8; and a limit stop device 18 for arresting segments 13 in said idle position, and preventing segments 13 from being positioned by elastic device 17 at a distance greater than said given distance from flange 7.

Device 17 comprises three pairs of sleeves 19, each of which is fitted to flange 7 coaxially with a respective axis A2, and presents a respective circular front opening 19a. The sleeves 19 in each pair are located substantially side by side, and extend on either side of flange 7 so that the opening 19a of one sleeve 19 faces one flange 15, and the opening 19a of the other sleeve 19 faces the other flange 15.

For each pair of sleeves 19, device 17 also comprises two tubular rods 20 located on either side of flange 7 coaxially with respective axis A2, and fitted rigidly at one end to respective bells 21 engaged inside respective holes 16 in each pair of holes 16. The free end of each rod 20, opposite the end connected to respective bell 21, is engaged in sliding manner through a respective opening 19a, and telescopically inside respective sleeve 19.

The pairs of sleeves 19 and respective rods 20 define a guide-slide device 22 for guiding segments 13 axially and in a given radial manner as they move in relation to elements 8 and 10. More specifically, segments 13 present an inside diameter greater than the outside diameter of relative element 10, and an outside diameter smaller than the inside diameter of element 8, to permit telescopic central body 6 to be moved by half-drums 5 between an expanded operating position top half of FIG. 1 wherein segments 13 are substantially aligned, along axis A1, with element 8 and respective elements 10, and a compressed operating position bottom half of FIG. 1 wherein segments 13 are inserted inside element 8, and elements 10 are inserted inside segments 13. Moreover, segments 13 and elements 10 are of such respective lengths as to permit telescopic central body 6 to vary its own length between a maximum value, approximately equal to but no greater than the sum of lengths of element 8, segments 13, and elements 10, and a minimum value substantially equal to the length of central element 8.

For each sleeve 19, device 17 also comprises a spring 23 fitted inside sleeve 19 and respective rod 20, and compressed between the end wall 24 of sleeve 19 at the opposite end of sleeve 19 to that presenting opening 19a, and the end wall 25 of rod 20 at the opposite end of rod 20 to that engaged inside respective sleeve 19. As such, one spring 23 of each pair of sleeves 19 and rods 20 provides for maintaining one of the two flanges 15 and the respective segment 13 in the respective idle position, while the other spring 23 of the same pair of sleeves 19 and rods 20 provides for maintaining the other of the two flanges 15 and the respective segment 13 in the respective idle position.

Limit stop device 18 comprises three pairs of pins 26, of which one pin 26 in each pair is integral with one of the two flanges 15, and the other pin 26 in each pair is integral with the other of the two flanges 15. More specifically, pins 26 extend, parallel to axis A1, from respective flange 15 and in sliding manner through respective through holes 27 formed in flange 7, and each present at the free end a head 28 larger crosswise than respective hole 27 and which engages in sliding manner a respective further through hole 29 formed through the other flange 15.

Operation of drum 1 will now be described with reference to FIGS. 1 and 2, and as of said expanded operating position of body 6.

As of the expanded operating position, screw 3 is rotated in known manner about axis A1 to bring half-drums 5 towards each other and both towards intermediate point by the same amount for each turn of screw 3; and, as half-drums 5 move towards each other, tubular elements 10 are gradually inserted inside respective segments 13 in the respective idle positions.

When elements 10 are fully inserted inside respective segments 13, and the respective front annular end surfaces 30 of elements 10 contact the respective lateral surfaces 31 of respective flanges 15, segments 13 themselves are eased inside respective portions 9 of element 8 by elements 10 and in opposition to springs 23.

Screw 3 stops rotating when body 6 reaches the compressed operating position, i.e. when rods 20 are fully inserted inside respective sleeves 19, heads 28 of pins 26 have moved through respective holes 29, and segments 13 are fully inserted inside respective portions 9 of element 8.

Obviously, therefore, since elements 10 are radially centered in relation to axis A1 by the sliding connection of respective half-drums 5 to shaft 2, since segments 13 are radially centered in relation to axis A1 by supporting assembly 14 and are guided axially in precise manner by guide-slide device 22, and since segments 13 only begin moving axially upon surfaces 30 contacting surfaces 31, it is practically impossible for any jamming of elements 8 and 10 and segments 13 to occur. Moreover, since the axial movement of elements 10 and segments 13 is controlled by screw 3, it is possible to determine a definite relative position of elements 8 and 10 and segments 13 by virtue of the definite relationship between the length of body 6 and the axial position of elements 10 and segments 13.

Figure 3:
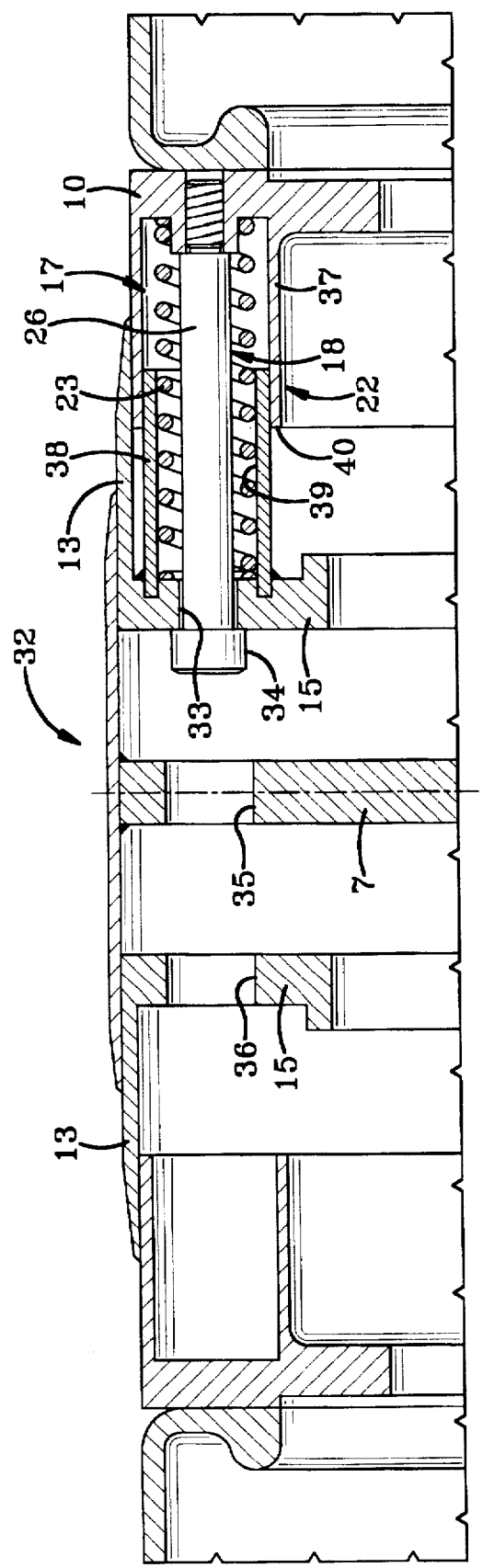
FIG. 3 shows a schematic axial half-section, with parts removed for clarity, of a central portion of a second preferred embodiment of the drum according to the present invention.

FIG. 3 shows a tire building drum 32, which is similar to drum 1, from which drum 32 differs substantially only for the fact that, in drum 32, elastic thrust device 17, limit stop device 18 and guide slide device 22 are coaxial with each other and are interposed between each flange 15 and the adjacent tubular end element 10. Owing to this, each intermediate tubular segment 13 is movable towards relevant element 10 in opposition to elastic thrust device 17.

In particular, each pin 26 (only one of which is shown in FIG. 3) of device 18 is integral with one of the two end elements 10, and extends from respective element 10 and in sliding manner through a respective through hole 33 formed in the relevant flange 15. Each pin 26 is provided, at its free end, with a head 34 larger crosswise than respective hole 33 and engaging in sliding manner a respective further through hole 35 formed through flange 7 and larger in diameter than head 34, and a further through hole 36 formed through the other flange 15 and having a diameter equal to that of hole 35.

Moreover, in drum 32, guide slide device 22 comprises, for each pin 26, two tubular rods 37 and 38, the first of which extends from each element 10 coaxially with pin 26, and the second of which extends from the adjacent element 8 coaxially with the relevant hole 33 and towards the adjacent element 10, and engages in a sliding manner the relevant tubular rod 37.

Rods 37 and 38 define a deformable chamber 39 accommodating a helical spring 23 of elastic thrust device 17, spring 23 being coaxial with the relevant pin 26 and being compressed between flange 15 and element 10.

In use, when elements 10 are moved towards flange 7, springs 23 remain extended until flanges 15 are in contact with flange 7. A further movement of elements 10 towards flange 7 is performed against the action of springs 23, which keep flanges 15 constantly in contact with flange 7. The movement of elements 10 towards flange 7 stops when elements 10 reach a retracted position in which the free end 40 of each rod 37 contacts the relevant flange 15.

When elements 10 are moved away from flange 7 starting from the above retracted position, springs 23 maintain flanges 15 in contact with flange 7 until heads 34 of pins 26 engage flanges 15 to cause intermediate segments 13 to move together with the relevant elements 10 and to remain to a fixed distance therefrom equal to the length of pins 26.

We claim:

1. A tire building drum, comprising:

(1) a central shaft;

(2) two coaxial cylindrical half-drums fitted in sliding manner to the central shaft;

(3) actuating means for moving the two half drums in opposite directions along the central shaft; and (4) a telescopic, substantially cylindrical central body coaxial with and connecting the two half-drums, wherein the central body in turn comprises;

(a) a central tubular element integral with an intermediate point of the central shaft, (b) two tubular end elements integral with respective half drums, (c) at least one intermediate tubular interposed between the central tubular element and each tubular end element, each intermediate segment being supported in a sliding manner by one of the central tubular element and the adjacent tubular end element, and (d) elastic means interposed between each intermediate segment and said one of the central tubular element and adjacent tubular end element, wherein the tubular end elements and the intermediate segments are axially movable in relation to the central tubular element and to one another in a manner allowing for controlled and definite relative position of each in relation to the other elements and segments.

2. The drum as claimed in claim 1 wherein each intermediate segment is movable towards said one of the central tubular element and the adjacent tubular end element that it is interposed between in opposition to said elastic means.

3. The drum as claimed in claim 2 wherein each intermediate segment is movable towards the central tubular element by virtue of the adjacent tubular end element.

4. The drum as claimed in claim 1 wherein each intermediate segment is a tubular segment having a tubular segment inside diameter greater than an outside diameter of the relative tubular end element, and a tubular segment outside diameter smaller than an inside diameter of the central tubular element.

5. The drum as claimed in claim 4 wherein said central tubular element and said tubular end elements, and said intermediate segments are of such lengths as to permit the telescopic central body to vary its own length between a maximum value, approximately equal to but no greater than the sum of the lengths of the central tubular element, the intermediate segments, and the tubular end elements, and a minimum value substantially equal to the length of the central tubular element.

6. The drum as claimed in claim 1 further comprising limit stop means interposed between each intermediate segment and said one of the tubular end elements and the central tubular element to arrest the intermediate segment in a given idle position in opposition to said elastic means.

7. The drum as claimed in claim 6 further comprising guide-slide means interposed between each intermediate segment and said one of the adjacent tubular end element and the central tubular element to guide the intermediate segment in its movements in relation to the central tubular element.

8. The drum as claimed in claim 7 wherein said intermediate segments are tubular segments, each of which has a first inner annular flange; and wherein said one of the central tubular element and the tubular end elements has a second inner flange; and said limit stop means being interposed between each first flange and the second flange to respectively guide the intermediate segments in its movements in relation to said one of the central tubular element and the tubular end element and to arrest the intermediate segments in a given idle position in opposition to said elastic means.

9. The drum as claimed in claim 8 wherein said guide-slide means comprise at least a sleeve integral with one of said two flanges and parallel to said central shaft; and a rod fitted to the other of said two flanges, coaxially with the sleeve, and engaged in sliding manner inside the sleeve.

10. The drum as claimed in claim 9 wherein said rod is a tubular rod closed by a first wall at the end opposite that facing the sleeve; the sleeve presenting a second wall at the end opposite that facing the rod; and said elastic means comprising at least a spring housed inside said sleeve and said rod and compressed between said first and second walls.

11. The drum as claimed in claim 10 wherein said limit stop means comprise at least a pin integral with one of said two flanges and parallel to said central shaft; and a hole formed in the other of said two flanges coaxially with the relative pin and engaged in sliding manner by the pin; the free end of the pin projecting beyond said hole and being fitted with a head larger crosswise than said hole.

12. The drum as defined in claim 11 wherein the elastic means is interposed between each intermediate segment and the central tubular element.

13. The drum as claimed in claim 1 wherein the actuating means is a drive screw and wherein each of the tubular end elements and intermediate segments are axially movable along the drive screw in a manner controlled by the drive screw so as to supply a definitive relative position of the central tubular element, tubular end elements, and intermediate segments in relation to each other at all times.

14. A tire building drum comprising:

(1) a central shaft;

(2) two coaxial cylindrical half-drums fitted in sliding manner to the central shaft;

(3) actuating means for moving the two half-drums in opposite directions along the central shaft; and (4) a telescopic, substantially cylindrical central body coaxial with and connecting the two half-drums, wherein the central body in turn comprises:

(a) a central tubular element integral with an intermediate point of the central shaft, (b) two tubular end elements integral with respective half-drums, (c) at least one intermediate tubular segment interposed between the central tubular element and each tubular end element, each intermediate segment being slidably positioned within the central tubular element and slidably positioned over one of the tubular end elements, and (d) elastic means interposed between each intermediate segment and said one of the central tubular element and an adjacent tubular end element, wherein the central tubular element, the tubular end elements, and the intermediate segments are axially movable in relation to one another in a manner allowing for controlled and definite relative position of each in relation to the other elements and segments.

15. The drum as claimed in claim 14 wherein each intermediate segment is movable towards at least one of the central tubular element and the adjacent tubular end element that it is interposed between in opposition to said elastic means.

16. The drum as claimed in claim 14 wherein said central tubular element and said tubular end elements, and said intermediate segments are of such lengths as to permit the telescopic central body to vary its own length between a maximum value, approximately equal to but no greater than the sum of the lengths of the central tubular element, the intermediate segments, and the tubular end elements, and a minimum value substantially equal to the length of the central tubular element.

17. The drum as claimed in claim 14 further comprising limit stop means interposed between each intermediate segment and said one of the tubular end elements and the central tubular element to arrest the intermediate segment in a given idle position in opposition to said elastic means.

18. The drum as claimed in claim 17 further comprising guide-slide means interposed between each intermediate segment and said one of the adjacent tubular end element and the central tubular element to guide the intermediate segment in its movements in relation to the central tubular element.

* * * * *